United States Patent [19]

Spitzberg

[11] Patent Number: 5,239,416
[45] Date of Patent: Aug. 24, 1993

[54] VARIABLE POWER ZOOM STAND MAGNIFIER

[75] Inventor: Larry A. Spitzberg, Bellaire, Tex.
[73] Assignee: Optical Designs, Inc., Houston, Tex.
[21] Appl. No.: 905,912
[22] Filed: Jun. 29, 1992
[51] Int. Cl.⁵ .......................................... G02B 27/02
[52] U.S. Cl. ................... 359/802; 359/672; 359/721
[58] Field of Search ............... 359/798, 799, 800, 802, 359/803, 806, 810, 815, 816, 721, 672, 676, 822, 823, 670, 668, 642

[56] References Cited

U.S. PATENT DOCUMENTS

| | | | |
|---|---|---|---|
| 151,746 | 6/1874 | Bausch | 359/672 |
| 199,015 | 1/1878 | Bausch . | |
| D. 303,119 | 8/1989 | Steel | D16/135 |
| D. 303,977 | 10/1989 | Steel | D16/135 |
| D. 306,175 | 2/1990 | Steel | D16/135 |
| 657,820 | 9/1900 | Gray . | |
| 775,353 | 11/1904 | Von Rohr . | |
| 953,879 | 4/1910 | Williams . | |
| 1,400,098 | 12/1921 | Perrin | 359/721 |
| 1,735,949 | 11/1929 | Brady . | |
| 1,814,540 | 7/1931 | Bander . | |
| 2,080,352 | 5/1937 | Weisse | 359/721 |
| 2,199,107 | 4/1940 | Kibbe . | |
| 2,493,110 | 1/1950 | Corman | 359/721 |
| 2,800,052 | 7/1957 | Bechtold . | |
| 2,951,417 | 9/1960 | Reeder . | |
| 3,232,302 | 2/1966 | Methot . | |
| 3,708,222 | 1/1973 | Stern . | |
| 3,740,122 | 6/1973 | Stern . | |
| 3,741,632 | 6/1973 | Stern . | |
| 4,190,322 | 2/1980 | Wortley | 359/668 |
| 4,203,651 | 5/1980 | Persson | 359/670 |
| 4,323,951 | 4/1982 | Pasco | 362/27 |
| 4,330,179 | 5/1982 | Sato | 359/672 |
| 4,365,871 | 12/1982 | Muchel | 359/672 |
| 4,514,048 | 4/1985 | Rogers | 359/676 |
| 4,836,659 | 6/1989 | Roote | 359/642 |
| 4,859,032 | 8/1989 | Feinbloom | 359/802 |
| 4,944,574 | 7/1990 | Roote | 359/802 |

FOREIGN PATENT DOCUMENTS 1037360 10/1986 United Kingdom .
1037361 10/1986 United Kingdom .
1037362 10/1986 United Kingdom .
1049389 3/1988 United Kingdom .

OTHER PUBLICATIONS

Sears, Zemansky & Young, *College Physics*, 5th Ed., May 1980, p. 687.
Levi & Leo, *Applied Optics: A Guide to Modern Optical Systems*, John Wiley & Sons., N.Y., 1968, pp. 480–481.
Jenkins & White, *Fundamentals of Optics*, 4th Ed. pp. 81–82, 84, 91–93 1976.
Rich, *Compound Magnifiers*, Journal of Vision Rehab 5(2), vol. 5, No. 2 pp. 9–10, & 15 1991.
Faye, *Clinical Low Vision*, 2nd Edition, pp. 124–127, 130, 143.

*Primary Examiner*—Loha Ben
*Attorney, Agent, or Firm*—Vaden, Eickenroht, Thompson, Boulware & Feather

[57] ABSTRACT

A two lens stand magnifier having variable degrees of magnification of an object at a constant distance from an observer is disclosed. A permanently mounted plus lens and a movably mounted minus lens are arranged on a stand such that the plus lens is a constant distance away from the object to be magnified. As the minus lens is moved relative to the positive lens, magnification of an object located on the opposite side of the plus lens from the minus lens varies while the image stays substantially in focus at the constant distance from the observer. Defocus of the image during movement is avoided by the choice of the lens powers as well as the spacing of the range of movement of the minus lens relative to the plus lens.

16 Claims, 3 Drawing Sheets

VARIABLE POWER ZOOM STAND MAGNIFIER

BACKGROUND OF THE INVENTION

This invention relates to a magnifying apparatus especially for use by the visually impaired, and more particularly, to a two lens stand magnifier with variable power and zooming capability.

The prior art is replete with numerous stand magnifiers which include, for instance, a plus lens which enables a person to view objects more clearly. For example, stand magnifiers consisting of a single plus (convex) lens and a holder are sold by COIL, Bausch & Lomb, Visolette, and others. Examples of such magnifiers include those shown in British Registered Design Nos. 1,037,361, 1,037,062, and 1,049,389, U.S. Design Pat. Nos. 303,977 and 306,175, corresponding to the first and second of those British registered designs, respectively, U.S. Pat. No. 4,944,574, also corresponding to the first of those registered designs, and U.S. Pat. Nos. 2,199,107 and 4,190,322. Although not illustrated in any of these patents, the COIL stand magnifier Nos. 5428 and 5123 are probably the most common medium power units in the industry.

The position of the lens of most such stand magnifiers is normally fixed with respect to the object to be magnified at a distance slightly within the focal length of the plus lens. Thus, a magnified virtual image is produced behind the object as shown schematically in FIG. 1. Perhaps the biggest disadvantage of such magnifiers is that the lens must be very close to the object to be magnified. Thus, for medium and high powered stand magnifiers, there is insufficient clearance, referred to as the "working distance", to allow the user of the magnifier to write or draw conveniently on paper positioned under the lens; further, the lens blocks illumination of the object.

The prior art systems are also generally of one power; thus magnifiers of different powers are required for different tasks. An example is the COIL 4210, 4212, 4215, and 4220 stand magnifiers having nominal 10×, 12×, 15×, and 20× magnifications, respectively. Previous magnifiers which claimed to be of variable power are really only variable focus as they are merely two plus lenses. As example is provided by the apparatus shown in U.S. Pat. No. 4,859,032. In these variable focus magnifiers, when one lens is moved slightly with respect to the other, variable focus results to neutralize refractive errors of the observer only. The magnification power does not change.

In referring to "magnification power", it is useful to note that stand magnifiers are specified by the equivalent power of the magnifier and eye system ($F_e$), by the eye to image distance (ID), by the transverse magnification of the image to object ratio ($M_T$), and/or by the magnification of the system ($F_e/4$). A useful equation (taken from I. Bailey, The use of fixed-focus stand magnifiers", 72 Optom. Monthly 37–39 (1981)) for expressing $F_e$ is $$F_e = 1/(ID) \; (M_T) \qquad (1)$$

For example, the above-mentioned COIL 5428 stand magnifier has an $F_e$ of 8.25 diopters at an eye to image distance ID of +2.50 diopters, or 40 cm, and the COIL 5123 has an $F_e$ of 17.0 at this image distance. Thus, magnification for these magnifiers is $F_e/4$, or 2× for the 5428 and 4.25× for the 5123.

A well known lens system used for zoom magnification purposes is a camera zoom lens system, shown schematically in FIG. 2. The structure of a camera zoom lens system, or variable power lens system, is not adaptable for use as a stand magnifier because a camera zoom lens is designed to perform a different function. Camera zoom lens systems are generally noncompact, multi-element lens systems designed to take a far away object (shown in FIG. 2 as the parallel rays entering minus lens $L_1$) and, with a many-fold change in magnification, project a real image I of that object which is continually sharp and clear on the film plane. The simplest two lens zoom system for a camera such as is shown in FIG. 2 requires that the plus lens $L_2$ move with respect to the minus lens $L_1$. To function appropriately, the object must be positioned beyond the focal point (also not shown) of the system. If an object is positioned within the focal point of the camera zoom lens system, as it is in the case of a stand magnifier, a real image will not be produced on the film plane. For any stand magnifier, including the stand magnifier of the present invention, the image from the object to be magnified is a virtual image at about 40 cm (+2.50 diopters) from the observer's eye.

Also, camera zoom lenses are characterized by certain disadvantages and limitations which make their structure unsuitable for use as a magnifier. For instance, multiple lens are required in zoom lens systems to accomplish the desirable goals of minimizing image aberrations and eliminating image movement. Of course, multiple lenses cannot economically be incorporated into and are not necessary in a stand magnifier, and, even if they could be, they would add to the weight and size of the magnifier.

Another well known apparatus used for magnification is the microscope. The microscope includes two highly corrected compound positive lenses used to obtain a magnification much greater than that obtainable with a simple stand magnifier. Microscopes generally have magnification powers of 25× and higher, whereas simple stand magnifiers have magnification powers of approximately 1.5× to 20×. An object must be placed beyond the focal length of the first lens of the microscope such that a real image is produced at or inside the focal length of the second lens. Great precision is required when building the microscope components and multiple powers are usually only obtained by switching between objective lenses of different powers. Thus, they are typically expensive, have low field of view, are highly corrected, and of high power.

Therefore, it is an object of the present invention to provide an improved and affordable two lens stand magnifier providing variable magnification zoom powers.

It is another object of the present invention to provide a stand magnifier with optics entirely different from that of present stand magnifiers of only a single plus lens, different from camera zooms that form a real image with a movable plus lens, and different from microscope optics with two plus lens systems.

It is another object of the present invention to provide an improved stand magnifier having an increased working distance between the lens and the object or print being magnified.

It is another object of the present invention to provide a stand magnifier in which the virtual image remains in focus at a convenient viewing distance, for instance, 40 cm or +2.50 D, for all powers.

It is yet another object of the invention to provide a method for varying the magnification power and the lens powers and spacings of a magnifier while maintaining the image in focus.

Still another object of the present invention is to provide a "family" of variable power zoom magnifiers, e.g., low, medium, and high power stand magnifiers, each magnifier in the family having approximately a two-fold increase in power over its range or magnification.

SUMMARY OF THE INVENTION

These objects, and the advantages of the present invention, are achieved by providing a two lens stand magnifier capable of varying degrees of magnification. In the preferred embodiment, the stand magnifier includes a plus lens permanently mounted to a stand at a predetermined distance, or working distance, above an object to be magnified. This predetermined distance is large enough to allow for increased illumination of the object being magnified and to allow for writing under the plus lens. The minus lens is movably mounted to the stand above the plus lens relative to the object being magnified. The minus lens is moved through a range of positions to change the magnification of the image as desired, the range through which the minus lens is moved being spaced relative to the plus lens so that the image of the object being magnified is always in focus while the magnification of the object increases. In the preferred embodiment of the present invention, the powers of the lenses and the spacing between the fixed lens and the range through which the movable lens is moved are selected so as to give a clear image of the object at a distance of about 40 cm and a two-image fold increase in power over that range with a convenient working distance for writing or drawing under the lens.

BRIEF DESCRIPTION OF THE PREFERRED EMBODIMENTS

So that the manner in which the above-recited features, advantages and objects of the invention, as well as others which will become apparent to those skilled in the art from the following description of the presently preferred embodiments thereof, are attained and can be understood in detail, more particular description of the invention briefly summarized above may be had by reference to the embodiments thereof that are illustrated in the drawings, which drawings form a part of the present specification. It is to be noted, however, that the appended drawings illustrate only one preferred embodiment of the invention and are, therefore, not to be considered limiting of its scope for, as noted throughout the specification, the invention may admit to other equally effective embodiments.

In the Drawings

FIG. 1 is a diagrammatic view of the lens system of a prior art single plus lens stand magnifier, for instance, that of the above-mentioned COIL 5123 or 5428 stand magnifiers.

FIG. 2 is a diagrammatic view of a simple prior art two lens camera zoom system having a movable plus lens, the plus lens being shown in two different positions in FIGS. 2A and 2B so as to illustrate the symmetry principle for a camera plus lens zoom. The lenses are identified as $L_1$ (minus lens) and $L_2$ (plus lens), the focal length of the minus lens $L_1$ is designated $f_1$, and the real and virtual images produced by the system are designated as I and I', respectively.

DETAILED DESCRIPTION OF THE PREFERRED EMBODIMENT

Figure 3:
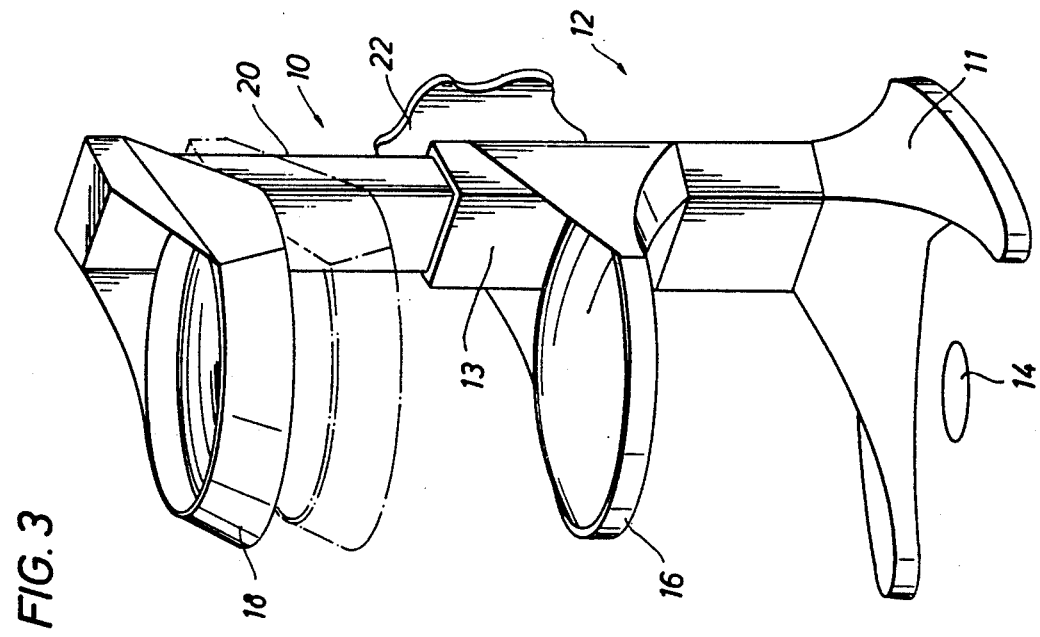
FIG. 3 is a perspective view of the preferred embodiment of the variable power stand magnifier of the present invention.

Now referring to the figures, and first to FIG. 3 in which a presently preferred embodiment of a variable power stand magnifier, indicated generally at reference numeral 10, is shown. Magnifier 10 is comprised of a stand 12 to which plus lens 16 and minus lens 18 are mounted, the stand being comprised of base 11 and upright 13 portions. The base 11 of stand 12 is placed over an object 14 to be magnified. Plus lens 16 is fixedly mounted to the upright 13 of stand 12. Minus lens 18 is mounted to the arm 20 which is telescopically received within upright 13 for vertical movement with respect to positive lens 16.

Means is provided for moving minus lens 18 relative to plus lens 16 to change the magnification of the object 14 in the form of arm 20, which is keyed (not shown) to move by rotation of crank 22. Those skilled in the art who have the benefit of this disclosure will recognize that other arrangements will function in a similar manner to achieve this same intended result. For instance, in one embodiment (not shown), arm 20 is slidably and telescopically received within the upright portion 13 of stand 12 and the position of minus lens 18 is fixed by frictional engagement of arm 20 by the inside surface of upright 13. In another embodiment (also not shown), the crank 22 is mounted on a screw, the end of which moves in and out of engagement with the exterior surface of arm 20 on the threads of the screw, to fix the position of minus lens 18. Likewise, a knurled wheel (not shown) can be fixedly mounted to a member which engages arm 20 which is provided with an exterior surface having a spiraling surface such that rotation of the wheel raises and lowers the arm 20 by the bearing of the spiraling surface against the top of the upright portion 13 of stand 12. These structures, and other variations thereof, are all contemplated by reference to the phrase "means for moving the minus lens relative to the plus lens".

In the preferred embodiment of this invention, placement of positive lens 16 and negative lens 18 relative to each other and to object 14 provides a substantially constant distance, for instance, +2.50 diopters or 40 cm (approximately 16 inches), between the eye of observer 24 and an image I' created by stand magnifier (see ID in FIGS. 4A and 4B) below positive lens 16, regardless of the magnification. The depth of focus of the human eye is approximately $\pm\frac{1}{8}$ diopter, hence the stand magnifier of the present invention is preferably designed to project a sharp, clear image at this distance ID, e.g., 40 cm $\pm\frac{1}{8}$ diopter. Those skilled in the art who have the benefit of this disclosure will recognize that slight head movements and accommodative changes can allow an image shift of ±½ diopter such that even a magnifier which focuses the image within that range is used to advantage. An observer can vary the position of minus lens 18 relative to plus lens 16 to vary the effective magnification power of stand magnifier 10 to increase the size of the image I' of the object 14 being magnified without having to move the head to position the eye 24 to maintain the focus of the image of the object being magnified. As will be explained, the image I' remains substantially in focus at that position of the eye at all magnification powers.

The powers of positive lens 16 and negative lens 18 are selected such that object 14 is positioned outside the focal length of positive lens 16 and within the effective focal length of stand magnifier 10. The first order ray trace equations set out below, and well known to those skilled in the art, are used to solve for the powers of the plus lens 16 and minus lens 18 for a given positive lens to object or print distance S1 wherein a fixed image plane is produced at two positions of the movable minus lens 18 (these parameters are listed infra and illustrated in FIGS. 4A and 4B).

Figure 2A:
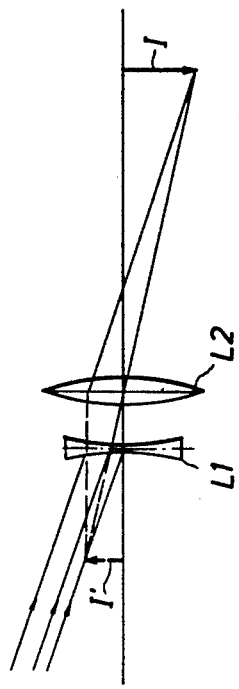
Figure 2B:
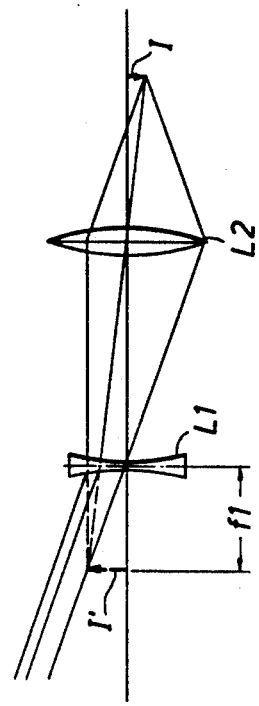

In accordance with the symmetry of a lens system, there are two symmetrical positions of the minus lens at which the images produced by the minus lens are located exactly in the same plane. This symmetry, as noted above, is also characteristic of the prior art camera, or plus lens, zoom shown in FIG. 2, in which the fixed minus lens serves to produce a virtual object to the movable plus lens. The symmetry results obtained with the movable minus lens zoom magnifier of the present invention are consistent with the zoom principle applicable to two lens zoom systems having a movable plus lens (described in L. Levi, *Applied Optics*: A Guide to Modern Optical System Design, John Wiley and Sons, Inc.: New York, page 480 (1968)). These results also apply when the plus lens is moved and the minus lens is fixed (see below) such that there are two symmetrical positions of the movable element where an image is formed in the same plane, at two different magnifications.

In the zoom magnifier of the present invention, the fixed plus lens serves to produce a virtual object for the movable minus lens and there are two positions of the minus lens at which the final image is at I' as shown in FIG. 4. As noted above, one of the objects of the present invention is to provide a family of stand magnifiers of various powers, and it has been found that convenient magnification ranges for each of the various powers are, for example, about 1.5 to about 2.9× (a low power magnifier), about 2.2 to about 4.4× (medium power), and about 3.8 to about 6.8× (high power). Having these magnification ranges as an object, the equations set out below are solved for the powers of the plus and minus lenses which produce two images I' with different magnifications at the same position using the symmetry of the two positions of the minus lens.

As will be shown after equation (16) below, the equations to be derived herein are solved for the lens powers used in a particular magnifier constructed in accordance with the present invention. Those equations are solved on the basis of certain input parameters, for instance, the 40 cm ID noted above, which are selected on the basis of the following. The most common bifocal add for elderly absolute presbyopes to clearly focus at near 40 cm is a +2.50 diopter add; hence, in the preferred embodiment, the magnifier of the present invention is designed to keep the image focused at 40 cm. A longer image distance ID of about +1.50 diopters is used to advantage for certain patients, and in the case of elderly low vision patients, a stronger bifocal of up to +5.0 diopters is used to achieve more magnification. For this reason, the present invention contemplates the use of an ID ranging from about +1.50 up to about +5.0 diopters.

Based on ergonometric studies, at least about 40 to 45 mm of clearance, or working distance, S1 is required to allow the use of a pen or pencil under the plus lens 16. Consequently, the preferred embodiment of even a high power (e.g., 3.8× to 5.8×) zoom magnifier constructed in accordance with the present invention, e.g., the magnifier with a working distance at the lower end of the range of working distances above 40–45 mm, is about 48 mm.

Another input parameter is the zooming range. As also noted in connection with the discussion of Table 3, infra, the preferred embodiment of the medium power zoom magnifier of the present invention is intended to cover the range of the magnification of the prior art COIL 5428 and 5123 stand magnifiers (2× and 4.25× magnification) such that a minimum factor of two is a practical zooming range because that range eliminates the need for these two individual stand magnifiers. A range of movement of the movable lens of the zoom lens magnifier at more than a few inches, however, would require the observer to re-position his/her head so as to keep the image I' in focus; thus, a maximum travel of about four inches, or 10 cm, was selected for use in the preferred medium power magnifier of the present invention. Those skilled in the art who have the benefit of this disclosure will recognize, however, that the specific range of movement of the moveable lens will depend on the magnification desired, the zooming range, the particular patient by whom the magnifier is to be used and the many other variables discussed in more detail throughout the present specification.

With specific regard now to the equations for obtaining lens power, in a two lens zoom with a movable minus lens, first order optics equations are utilized to find the image distance SP1 from the plus lens with focal length f1 where the distance of the object to the positive lens, the working distance, is S1. The equation is derived from $L'=L+F$, i.e., the relationship between image vergence $L'$ and object vergence $L$. Re-arranging and substituting, where $L'=1/SP1$ and $L=1/S1$, gives:

$$1/SP1 - 1/S1 = 1/f1. \tag{2}$$

The image at SP1 becomes the object for the movable minus lens of focal length f2. Thus, the distance to the image created by the plus lens to the minus lens is S2. The following equations are then solved to obtain the powers of minus lens 18 (1/f2) and plus lens 16:

$$1/SP2 - 1/S2 = 1/f2 \tag{3}$$

(using $L'=L+F$ for the plus lens).

Figure 4A:
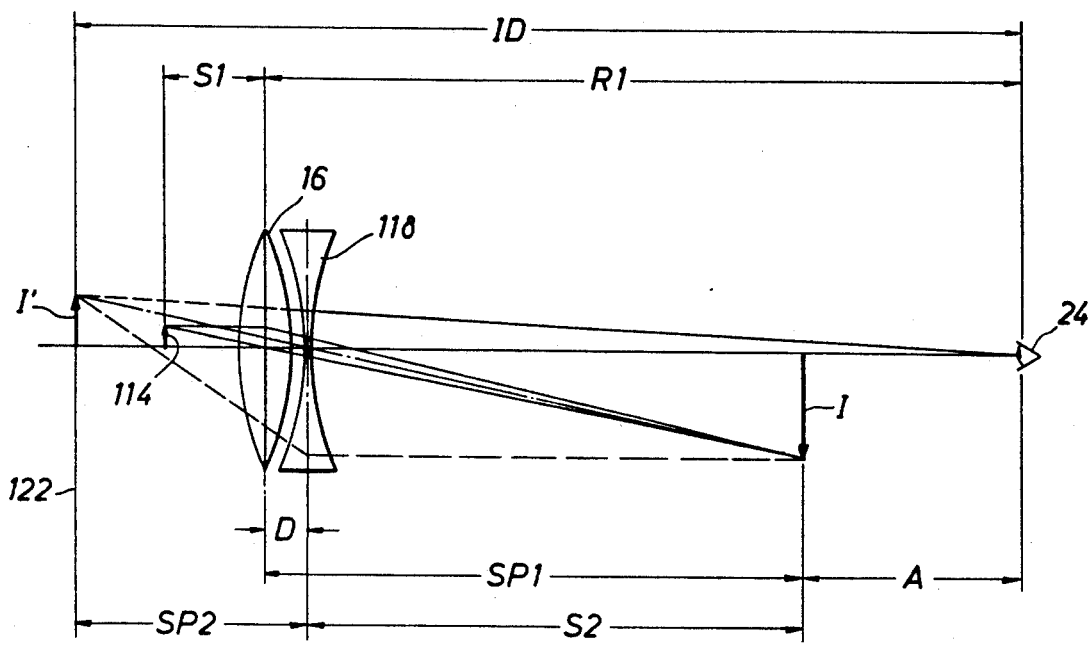
FIGS. 4A and 4B are diagrammatic views of the lenses comprising the stand magnifier shown in FIG. 3.
Figure 4B:
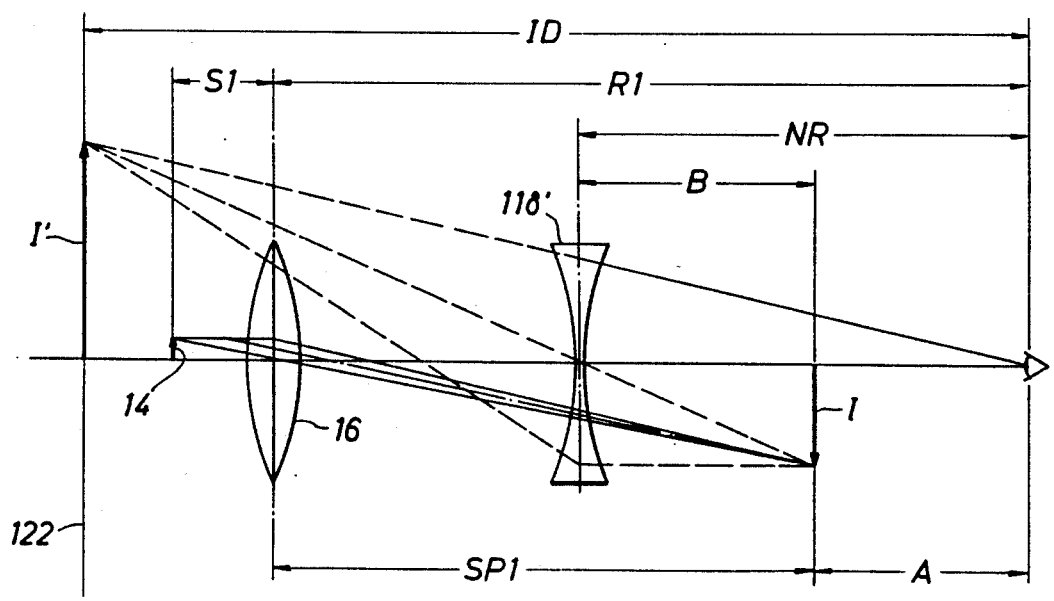

FIGS. 4A and 4B show the relationship of these variables relative to plus lens 16 and minus lens 18 in a first position 118 closer to plus lens 16 and minus lens 18 and in a second position 118' further from plus lens 16, diagrammatically. This lens system is arranged to generate two images I' of object 14 of two different magnifications $M_T$ on image plane 122 ("I" is used to identify an image regardless of its magnification). In order to identify the powers of the positive and negative lenses, the following additional information must be considered and substituted into equations (2) and (3) to solve for f1 and f2.

The solution is based on the symmetrical relationship between object and image at the two positions. The location of the plus lens 16 relative to object 14 is fixed. The minus lens 18 is placed at the first position 118. The minus lens, then, is moved to a second position 118' so that the image location is the same as the first position. The following parameters are identified in FIGS. 4A and 4B:

S1 = working distance between the object 14 and the plus lens 16
S2 = distance between the minus lens 18 and the image formed by the plus lens 16
ID = distance from image I to observer 24
R1 = distance between plus lens 16 and observer 24
A = distance between image formed by plus lens 16 and observer's eye 24
B = distance between second position 118' of minus lens 18 and image formed by plus lens 16
D1 = distance between the plus lens 16 and the first position 118 of minus lens 18
D = distance between the plus lens 16 and the positions of minus lens 18
NR = distance between the second position 118', of minus lens 18 and observer 24
F1 = power (in diopters) of plus lens 16
F2 = power (in diopters) of minus lens 18
SP1 = distance between the plus lens 16 and the image formed by plus lens 16
SP2 = distance between minus lens 18 and the image formed by the system 10
$M_{T1}$ = transverse magnification when minus lens 18 is at the first position 118
$M_{T2}$ = transverse magnification when minus lens 18 is moved to the second position 118'

From the physical relationship of the distances shown in FIGS. 4A and 4B and equations (2) and (3), the following equations were derived to solve for the two lens powers, first for the first position 118 of minus lens 18:

$$S2 = ID - A - SP2 \qquad (5)$$

and then for the second position 118' of minus lens 18 at which the image is in focus at I, e.g., at the same S2, and substituting:

$$S2 = ID - (A + B). \qquad (6)$$

Referring to FIGS. 4A and 4B and the above list of parameters, it can be seen that NR is defined as A+B, and making that substitution gives:

$$S2 = ID - NR \qquad (7)$$

Since, from the symmetry principle, if I' is to remain stationary, the object and image distances from lens 18 at the two positions 118 and 118' must be interchangeable, SP2 (object distance at position 118) must equal B (image position at position 118'):

$$SP1 = D1 + ID - NR. \qquad (8)$$

From equation (7), S2=ID−NR, and substituting into equation (8) gives:

$$SP1 = D1 + S2. \qquad (9)$$

Then, rearranging equation (2) gives:

$$f1 = (S1 * SP1)/(S1 - SP1), \qquad (10)$$

and $$F1(Diopters) = 1/f1. \qquad (11)$$

From inspection of FIG. 4A, $$SP2 = R1 - D1 - ID \qquad (12)$$

and rearranging equation (3) gives $$f2 = (S2 * SP2)/(S2 - SP2) \qquad (13)$$

and $$F2(Diopters) = 1/f2. \qquad (14)$$

To find the magnification of the image I' when the minus lens 18 is in the two positions 118 and 118', shown in FIG. 4, the following equations, from first order optics and the relationship between the object and image distances and transverse magnification $M_T$, are used:

$$M_{T1} = (SP1/S1) * (SP2/S2) \qquad (15)$$

$$M_{T2} = (SP1/S1) * (S2/SP2). \qquad (16)$$

With the previously mentioned desired observer to image distance (ID) of 40 cm, a few other variables must be specified to be able to solve for f1 and f2, including a plus lens to object working distance (S1) of 6.5 cm (again to allow ample room for writing under the plus lens of medium magnifier), a plus lens to observer distance (R1) of 19 cm, a distance between the second position of negative lens and observer (NR) of 10 cm, and a distance D1 between the two lenses of 1 cm (the values of these variables were selected for use in connection with the preferred embodiment of the present invention, intended as a medium range magnifier). These specific parameters were substituted in the equations above to give a plus lens power of 18.6 diopters and a minus lens power of −7.7 diopters; as noted above, those skilled in the art will recognize that other parameters are used to advantage as well. Magnification of the system 10 with minus lens 18 in the position 118 close to the plus lens is 2.3×. This value increases by almost two fold up to 3.8× when negative lens 18 is in the second position 118' (see Table 1).

TABLE 1

| D (cm) | ID (cm) | $M_T$ | $F_e$ | Magnification |
|---|---|---|---|---|
| 1.0 | 40.0 | 3.7 | 9.3 | 2.3x |
| 8.0 | 40.0 | 6.1 | 15.3 | 3.8x |

Once the lens powers have been determined, the distance ID between the image I' and the observer 24 is solved for as minus lens 18 is moved from a first position 118, 0.5 cm from the plus lens 16 (e.g., D=0.5 cm), to a second position 118' 9.5 cm from plus lens 16 in 1.0 cm increments. This simple paraxial ray trace solution for this plus and minus lens system shows that the position of the image I' is maintained at a distance ID of approximately 40 cm from the observer. Thus, the object remains effectively in focus (±⅛ diopter) at 40 cm. The following Table 2 shows the results obtained at each increment in a zoom magnifier including a plus lens of 18.6 diopters and a minus lens of −7.7 diopters:

TABLE 2

| D (cm) | ID (cm) | $M_T$ | $F_e$ | Magnification |
|---|---|---|---|---|
| 0.5 | 40.2 | 3.5 | 8.8 | 2.2x |
| 1.5 | 39.8 | 3.8 | 9.5 | 2.4x |
| 2.5 | 39.5 | 4.0 | 10.1 | 2.5x |
| 3.5 | 39.2 | 4.3 | 10.9 | 2.7x |
| 4.5 | 39.1 | 4.6 | 11.8 | 3.0x |
| 5.5 | 39.1 | 5.0 | 12.7 | 3.2x |
| 6.5 | 39.3 | 5.4 | 13.7 | 3.4x |
| 7.5 | 39.7 | 5.9 | 14.9 | 3.7x |
| 8.5 | 40.4 | 6.2 | 16.2 | 4.1x |
| 9.5 | 41.5 | 7.3 | 17.6 | 4.4x |

The changes in focus of image I' resulting from these minor variations in ID are either undetectable by the human eye or within the range of variation which can be compensated for by the eye. In diopters, this change in ID from a low of 39.1 cm to a high of 41.5 cm over a range of movement of minus lens 18 of 9 cm (0.5 to 9.5 cm) is, respectively, +2.56 diopters to +2.41 diopters. In most cases, the observer is capable of moving his/her head to compensate for wider variation in ID, but in the preferred embodiment, the spacing between this range over which the minus lens 18 is moved relative to plus lens 16 is such that the image I' stays either focused or within the range of defocus which can be compensated for by the eye. Thus, the image remains in focus while, as Table 2 shows, the transverse magnification $M_T$ is increased by a factor of approximately two fold from about 2.2× to about 4.4× (in the medium power, preferred embodiment).

Once these powers of $F_1$ and $F_2$ are solved for using these equations (2) through (16), the results are optimized using, for instance, the ACCOS V optical design computer program (Optikos Corp., Boston, Mass.) on a 486-based computer. For instance, the curvatures of the plus 16 and minus 18 lenses are varied to optimize the positions of the image, to control aberrations, and maximize field of view. In the particularly preferred embodiment, the steepest surface of the plus lens 16 (e.g., closer to minus lens 18) is aspheric to control aberrations and, especially, to reduce distortion to a minimum.

Figure 1:
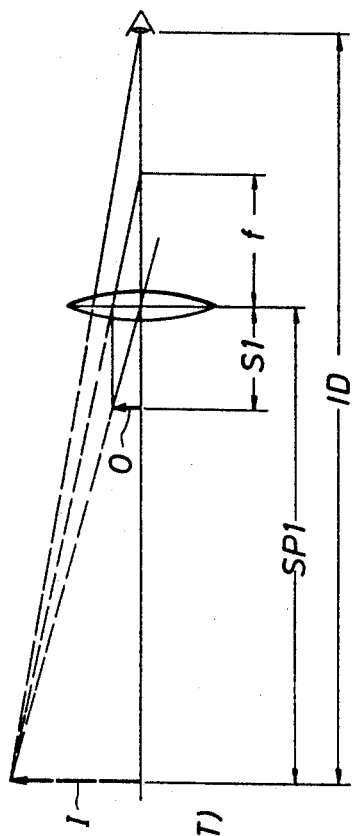

There is more to the advantage of the movable minus lens of the magnifier of the present invention than just a zoom magnifier with a power range of two. The working distance S1 from lens 16 to object 14 or print is increased compared to that of, for instance, the single plus lens stand magnifier illustrated in FIG. 1 so that the illumination of the object or print increases and writing or drawing under the magnifier is made much easier. This advantage is easily seen by comparing the zoom magnifier of the present invention to the two prior art COIL stand magnifiers at the medium and high end of the zoom range, specifically, the No. 5428 and 5123 magnifiers, with $F_e$=8.25 diopters and 17.0 diopters at the 40 cm viewing distance, respectively, each having working distances of 36 mm and 29 mm, respectively. The preferred embodiment of the medium power (e.g., $F_e$=8.8 up to 17.6 diopters) movable minus lens zoom magnifier of the present invention has a working distance of about 65 mm. Working distances ranging from about 45 to about 110 mm are used to advantage in the other high and low power embodiments of the present invention.

Figure 5A:
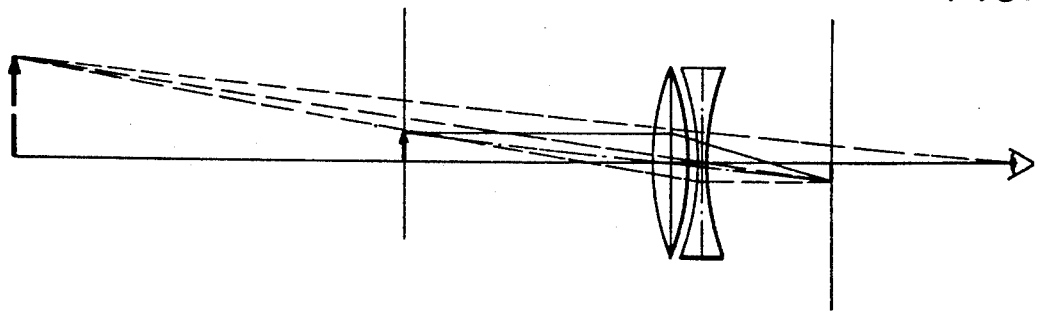
FIGS. 5A and 5B are diagrammatic views of the lenses comprising an alternative embodiment of the stand magnifier of the present invention.
Figure 5B:
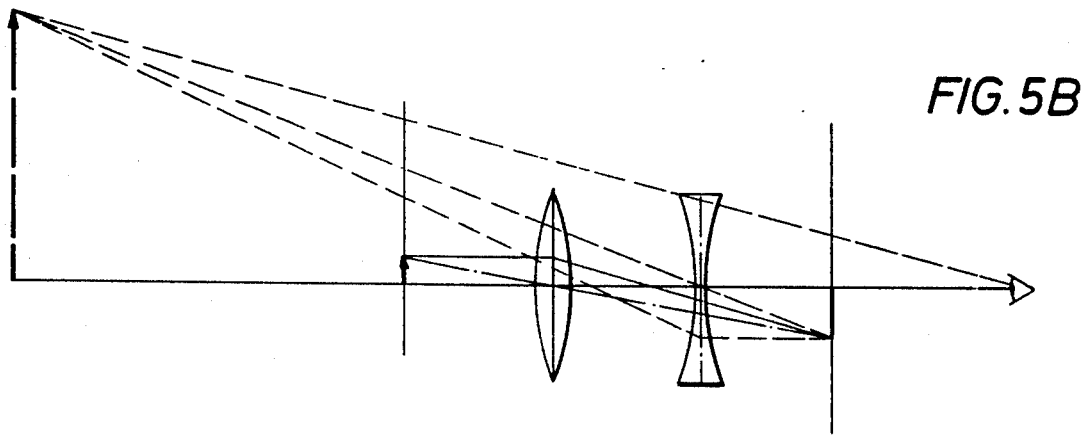

Although described in terms of the presently preferred embodiment illustrated in FIGS. 3, 4A, and 4B, those skilled in the art who have the benefit of this disclosure will recognize that the same functional result, i.e., variable magnification with the image in focus at a specified ID, can also be achieved by fixing the minus lens 18 and moving the plus lens 16 relative thereto as shown in FIGS. 5A and 5B, in which like structure is labelled using reference numerals with a "2" prefix. The disadvantage to this alternative embodiment, as illustrated in FIGS. 5A and 5B, is the resulting height of such a stand magnifier. In other words, because minus lens 218 must be fixed at some height above the object 214 selected so as to allow a range of movement of the lower plus lens 216 relative thereto which is spaced at the distance needed to maintain the image I in focus, the minimum height of the magnifier will always be specified by the position of fixed minus lens 218. By contrast, when a fixed plus lens is used as shown in FIGS. 3, 4A, and 4B, the magnifier is capable of being "collapsed", or shortened in height, by moving minus lens 218 to the position shown at reference numeral 118 in FIG. 4A. This advantage is so significant that reference is made throughout the present application to movement of the minus lens almost exclusively. It will be understood, however, that these references to the movement of the minus lens are to be construed so as to also contemplate movement of the plus lens.

The increased working distance of the zoom magnifier of the present invention (compared to single plus lens systems) is because as the power increases, the first principal plane 326 resulting from a two lens system moves forward while the plus lens 16 (and thus, the working distance) remains fixed as minus lens 18 is moved further from plus lens 16. Analysis using principal planes is informative because it allows analysis of the plus and minus lens system of the present invention to be reduced to a single plus lens system. The resulting single plus lens system can then be more easily compared to the position(s) of the plus lens in the prior art single plus lens stand magnifiers such as the popular above-mentioned COIL magnifiers.

Figure 6A:
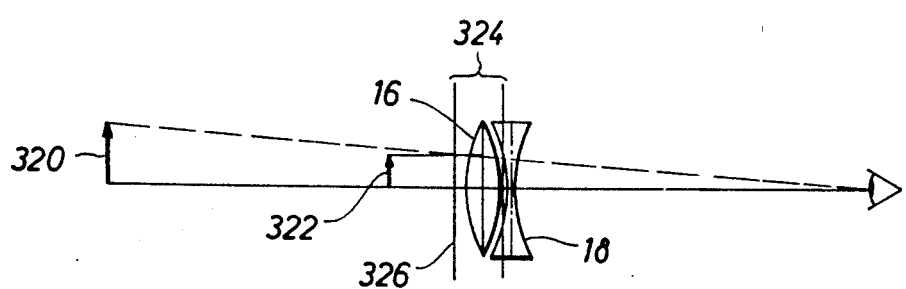
FIGS. 6A–6C show the images produced and the movement of the principal places caused by varying the magnification power of a stand magnifier constructed in accordance with the present invention.
Figure 6B:
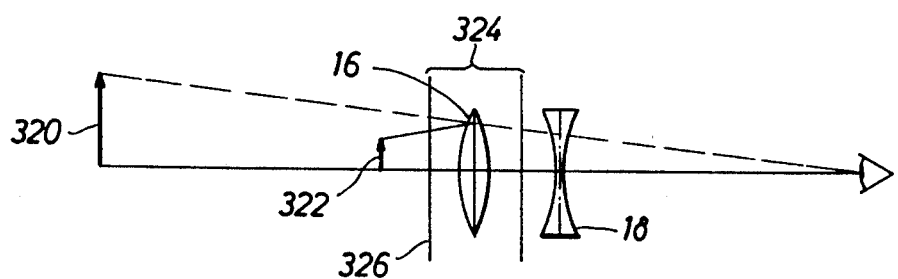
Figure 6C:
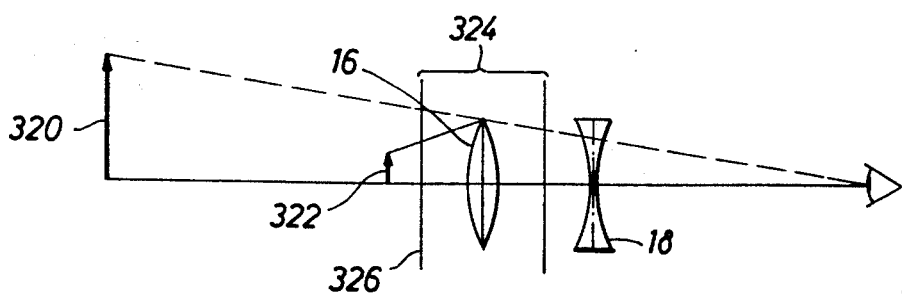

FIGS. 6A-6C show minus lens 18 moving from a position near positive lens 16 in FIG. 6A, where image 320 of object 322 is created, to positions further away from positive lens 316 in FIGS. 6B and 6C. As the distance D between the two lenses increases, the image of object 322 is magnified in approximately the same image plane. The principal planes 324 move as shown so that the effective power increases as the image is magnified. This increase in the power of the plus and minus lens combined is seen from the following relationship between the powers of the plus lens F1 and the minus lens F2:

$$F = F1 + F2 - (t/n)F1F2 \qquad (17)$$

Equation (17) is the general equation for resulting power F from two lenses in combination, where t is the distance between lenses and n is the index of refraction of the space between lenses (in the case or the present invention, n is 1, the index of refraction of air). If F1 and F2 are of opposite sign (as they are in the present invention), then (t/n)F1F2 is negative and F increases as the lenses are moved apart. For example, in the preferred embodiment of the zoom magnifier of the present invention described above, where $F_1 = +18.6$ and $F_2 = -7.7$, when t is 0 and the lenses are close together, F is +10.9 diopters. When t is about 2.5 cm, or 1 inch, F is +14.1 diopters. When t is about 5 cm, or 2 inches, F is +17.9 diopters. At t=2.5 cm, the first principal plane moves toward the object by about 9 mm from the plus lens and by about 15 mm when t is 5 cm. Thus, there is a 9 mm and 15 mm increase in the working distance with the zoom system of the present invention as compared to that of prior art single plus lens magnifiers because the plus lens can be further away from the object since the first principal plane move forwards in the case of the present invention. This advantage is very significant at the higher powers where the working distance of a single plus lens magnifier is very small, e.g., 29 mm in the COIL 5123 magnifier as compared to the 48 mm working distance S1 of a preferred embodiment of the high power zoom magnifier of the present invention (see Table 3, below).

By using the equations set out above and specifying other working distances, minus lens zoom magnifiers have been designed to give various ranges of magnification, for instance, low, medium and high magnification and power. A longer working distance using the symmetry principle results in a lower power zoom magnifier and a shorter distance gives a higher power magnifier. The $F_1$ and $F_2$ for different power zoom magnifiers at specified, representative working distances with ID=40 cm are set out in the following Table 3. This Table 3 sets out the range of magnification for a minus lens movement of 6 to 9 cm where the image stays in focus ($\pm$ about $\frac{1}{8}$ diopter) at 40 cm within this range of movement of the minus lens.

TABLE 3

|  |  | Low Power Zoom | Medium Power Zoom | High Power Zoom |
|---|---|---|---|---|
| Plus lens | $F_1$ (D) | +14.7 | +18.6 | +23.8 |
| Minus lens | $F_2$ (D) | −9.0 | −7.7 | −7.0 |
| Working Distance | S1 (cm) | 9.0 | 6.5 | 4.8 |
| Power Range |  |  |  |  |
| Low End of Range | $M_{T1}$ | 2.4 | 3.5 | 6.3 |
|  | $F_e$ (D) | 5.9 | 8.7 | 15.1 |
|  | Mag. | 1.5x | 2.2x | 3.8x |
| High End of Range | $M_{T2}$ | 5.2 | 7.3 | 10.5 |
|  | $F_3$ (D) | 11.7 | 17.6 | 23.0 |
|  | Mag. | 2.9x | 4.4x | 5.8x |

In this "family" of preferred magnifiers constructed in accordance with the systematic design principles of the present invention, the ranges of power overlap slightly and magnification varies by approximately a factor of two over the range of movement of the lenses. As can be seen from Table 3, for example, the equivalent power of the eye and magnifier system $F_e$ for the low end and high end of the power range for the preferred medium power zoom magnifier is given as +8.7 and +17.6 diopters, respectively. The two above-described 5428 and 5123 COIL magnifiers have an $F_e$ of +8.25 and +17.0 diopters, respectively, such that the single medium power zoom magnifier of the present invention effectively covers the range of both of these prior art magnifiers.

Although the invention has been described in terms of the presently preferred embodiments thereof, it will be recognized by those skilled in the art who have the benefit of this disclosure that certain changes can be made to that embodiment without departing from the spirit and scope thereof. For instance, different working distances, resulting in the use of lenses of different powers, can be used to build zoom magnifiers with different ranges of magnifications. The image to observer distance can also be varied and the powers of the lenses solved for to obtain magnifiers in which the image is focused at some point other than the preferred 40 cm (+2.50 diopter) distance. All such variations, and many others, are intended to fall within the scope of the following claims.

What is claimed is:

1. A stand magnifier capable of varying degrees of magnification of a substantially constant position virtual image of an object comprising:

a stand;

a plus lens mounted to said stand at a working distance selected so that when an object to be magnified rests on the same surface on which said stand rests, the object is outside the focal distance of said plus lens;

a minus lens mounted to said stand above said plus lens; and means for moving said minus lens relative to said plus lens to change the magnification of the virtual image of the object below said plus lens as the distance between said plus lens and said minus lens is changed by moving said minus lens from a first to a second position, the spacing between said plus lens and the range through which said minus lens is moved being selected so that the image is substantially in focus at a predetermined image distance from the observer as said minus lens is moved.

2. The magnifier of claim 1 wherein the magnification of the virtual image is increased by about 2× as the distance between said plus lens and said minus lens is increased.

3. The magnifier of claim 1 wherein the working distance is sufficient to allow adequate illumination of the object and, when the object is an object on which the observer desires to write or draw, sufficient clearance for the hand and writing implement of the observer.

4. The magnifier of claim 3 wherein the working distance is greater than about 45 mm.

5. The magnifier of claim 1 having lens powers calculated for a given set of parameters of working distance S1, image distance ID, and distances between lenses in first D1 and second B positions for the symmetry condition.

6. The magnifier of claim 5 wherein:

S1 is between about 45 and about 110 mm;

ID varies by less than about −1.00 diopter to about +2.50 diopters about the +2.50 diopter position; and the range of movement D is limited by about ±0.50 diopter of defocus of the image.

7. The magnifier of claim 6 wherein ID varies by about ±$\frac{1}{8}$ diopter.

8. The magnifier of claim 6 wherein D varies between about 1.0 and about 9.0 cm.

9. The magnifier of claim 1 wherein the image distance is about 40 cm.

10. The magnifier of claim 1 wherein said minus lens is moved through a range of up to about 9 cm.

11. A method for varying the magnification of an object comprising the steps of:

fixing a first lens at a selected working distance above an object to be magnified, the working distance being greater than the focal length of the first lens;

positioning a second lens above the first, fixed lens, for movement relative to the fixed lens to produce a system focal length such that the object is positioned within the system focal length and a virtual image of the object is produced at a first magnification power at a selected image distance from the observer and below the fixed lens; and changing the magnification of the virtual image by moving the second lens relative to the fixed lens, the spacing of the fixed lens and the range of movement of the second, movable lens being selected so that, as the movable lens is moved to change magnification, the image stays substantially focused at the image distance from the observer.

12. The method of claim 11 wherein the image is magnified by a factor of about 1.5 to about 5.8.

13. The method of claim 11 wherein the movable lens is moved through a range of up to about 9 cm.

14. The method of claim 11 wherein the movable lens is moved through a range of from about 0.5 to about 9.5 cm from the fixed lens.

15. The method of claim 11 wherein the image distance is substantially constant during movement of the movable lens.

16. The method of claim 11 wherein the magnification of the image and the range of movement of the movable lens is limited by about ±¼ diopter of defocus of the image.

* * * * *